May 22, 1934. N. H. RICKER 1,960,028
MEANS OF ELECTRICAL PROSPECTING
Filed April 26, 1930

NORMAN H. RICKER
INVENTOR
Jesse R Stone
BY Lester B Clark
ATTORNEYS.

Patented May 22, 1934

1,960,028

UNITED STATES PATENT OFFICE 1,960,028

MEANS OF ELECTRICAL PROSPECTING

Norman H. Ricker, Houston, Tex.

Application April 26, 1930, Serial No. 447,474

4 Claims. (Cl. 175—182)

This invention relates to electrical methods of prospecting for oil, gas, water, ore bodies, and any other buried masses whose electromagnetic constants are different from those of the surrounding earth.

The invention lies in the realm of electromagnetic prospecting and embodies certain novel principles, which make prospecting very much simplified and extends the usefulness of prospecting by electromagnetic methods.

This invention makes use of principles of symmetry and recognizes the elliptical or rotating nature of the electromagnetic field in the neighborhood of a conducting mass. The fundamental ideas of this invention are concerned with the setting up of such an alternating electromagnetic field which, when set up in a region where the earth's subsurface is homogeneous and the earth's surface is plane, would possess symmetry about one or more planes.

It is one of the objects of the invention to provide an electromagnetic field which normally possesses symmetry about one or more planes under homogeneous conditions of the earth's subsurface, but which is subject to distortion by the nonhomogeneity and asymmetry of the subsurface formations.

Another object of the invention is to devise an apparatus for setting up such an electromagnetic field which normally possesses symmetry about one or more planes perpendicular to the earth's surface.

Still another object of the invention is to set up an electromagnetic field by disposing a closed metallic conductor in a plane parallel with the earth's surface, so that this conductor will outline a plane figure which possesses symmetry about one or more lines in its plane, and passing an alternating electric current therethrough.

It is also an object of the invention to make observations of such an electromagnetic field to determine the nature of the earth's subsurface by noting the variations from the symmetrical distribution of the field which would normally obtain.

Other and further objects of the invention will be readily apparent to those skilled in the art when the following description is considered in connection with the accompanying drawing wherein.

Figure 3:
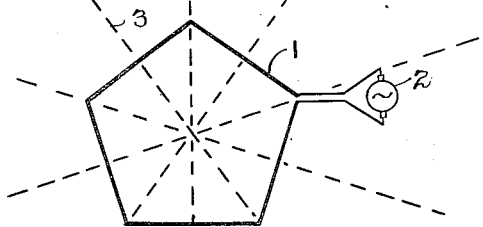

Fig. 3 likewise shows a means of setting up an electromagnetic field possessing normally five planes of symmetry—the metallic conductor being disposed in the form of a regular pentagon.

Figure 4:
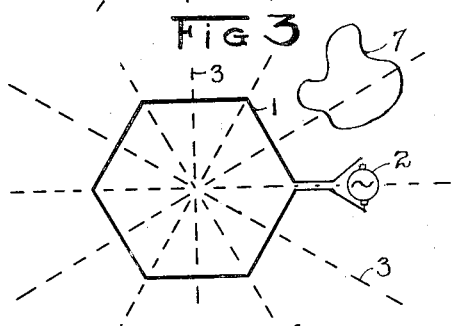

Fig. 4 likewise shows a means of setting up an electromagnetic field possessing normally six planes of symmetry—the metallic conductor being disposed in the form of a regular hexagon.

Figure 1:
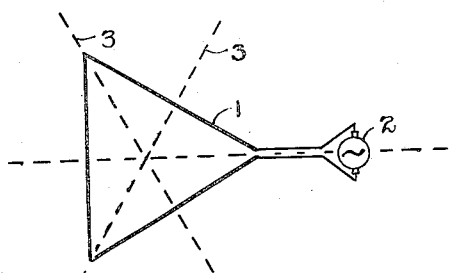
Fig. 1 shows a means of setting up an electromagnetic field possessing normally three planes of symmetry by disposing a metallic conductor upon the earth's surface in the form of an equilateral triangle and passing an alternating electric current through said conductor.
Figure 5:
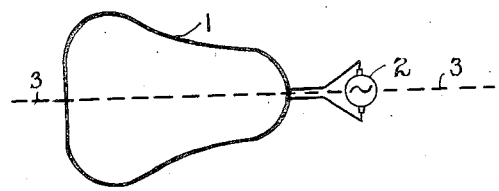
Figure 2:
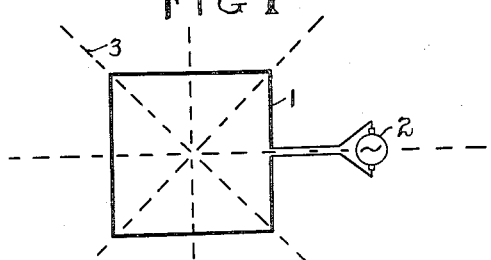
Fig. 2 shows a means of setting up an electromagnetic field possessing normally four planes of symmetry by disposing a metallic conductor upon the earth's surface in the form of a square and passing an alternating electric current through said conductor.

Fig. 5 likewise shows a means of setting up an electromagnetic field possessing normally a single plane of symmetry—the metallic conductor being disposed in the form of a plane figure with a single line of symmetry.

Figure 6:
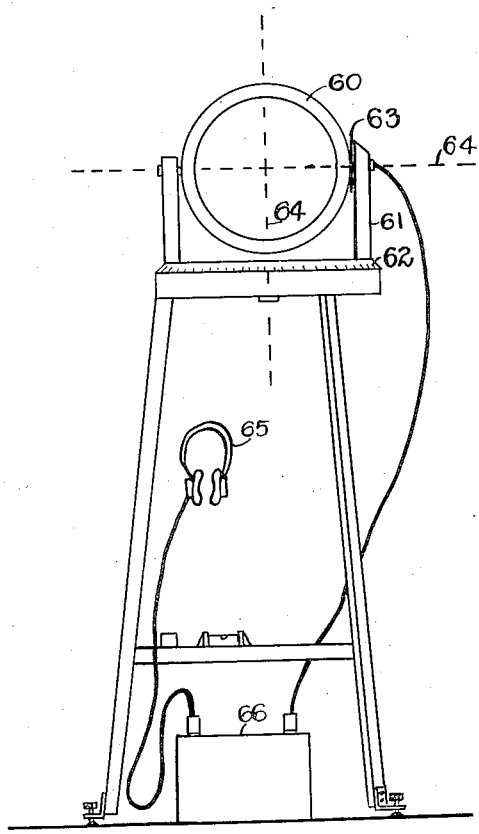

Fig. 6 shows one form of apparatus which may be used in connection with the invention for making observations of the electromagnetic field.

The invention may be practiced by creating the electromagnetic field as shown in say Fig. 4. This comprises laying an insulated cable 1 parallel with the earth's surface and in the form of a regular hexagon. This hexagon may be of any diameter and might be of considerable size. The ends of the cable are connected with a generator 2 so that an alternating electric current may be passed through the cable. It will be readily apparent that the electromagnetic field set up by the alternating current passing through the cable will possess six planes of symmetry provided the earth's subsurface is homogeneous. The dotted lines 3 represent the traces of these planes of symmetry where they intersect the earth's surface. The magnetic component of the electromagnetic field set up by the current in the cable 1 may be observed by the apparatus shown in Fig. 6 or any similar type of apparatus, which includes a loop such as 60 which is mounted upon uprights 61 which are in turn connected with a rotatable scale or dial 62. A scale 63 is carried by one of the uprights 61 so that the tilting of the loop from the vertical plane may be observed. In this manner the loop 60 may be rotated or oscillated at any desired angle about either the vertical or horizontal axis, which axes are indicated by the dotted lines 64 in Fig. 6. A pair of headphones 65 or other apparatus may be used to indicate whether or not electric currents are being induced into the loop. A vacuum tube amplifier is provided to amplify the feeble loop currents until they are sufficiently strong to actuate the telephone receivers 65.

I shall now describe the manner in which the invention is practiced and shall do so for the arrangement shown in Fig. 4, with the understanding that a similar procedure may be carried out with any of the arrangements of cable as will be readily understood by any one versed in the art.

I first select a point on the earth's surface which is to be the center of the survey. I then drive six stakes in the earth at equal distances from the center of the survey in such a manner that these six stakes are at the six vertices of a regular hexagon. I then lay an insulated cable such as 1 from stake to stake until the cable lies in the form of a regular hexagon. The free ends of the cable I then connect to an alternating current generator 2 of any desired frequency. An audible frequency is convenient because of the ease of detecting the electromagnetic field by audio methods. I then pass the alternating current through the cable by means of the generator. Now that the electromagnetic field has been set up I make observations on it by means of an apparatus such as that shown in Fig. 6. This instrument is set up along one of the dotted lines 3 shown in Fig. 4. In this position if the earth's subsurface is homogeneous the plane of the vibration ellipse of the magnetic component of the electromagnetic field must lie in a vertical plane whose trace is the above mentioned dotted line. Observations of the electromagnetic field are now made with the instrument. I rotate the loop 60 about both vertical and horizontal axes until no tone is heard in the telephone receivers 65. The plane of the receiving loop now lies in the plane of the vibration ellipse of the magnetic component of the electromagnetic field. By reading the angular scales 62 and 63 for this condition and for the condition wherein the plane of the receiving loop is vertical and passes through the center of the survey the deviation from a symmetrical condition of the electromagnetic field may be measured.

I confine my observations to these planes of symmetry because we know that if the earth's subsurface is homogeneous, the plane of the vibration ellipse of the magnetic component of the electromagnetic field must be vertical and pass through the center of the survey. Thus deviations from symmetry may be readily detected and measured. This deviation from a normal symmetrical distribution of the field is to be associated with the presence of a nonhomogeneous and asymmetrical earth's subsurface. This invention thus locates regions wherein the earth's subsurface is abnormal from an electromagnetic point of view—that is it locates electromagnetic anomalies. To what buried masses these anomalies are due depends upon the geology of the particular area in question, and is a different problem in different parts of the country.

The advantage which this method has over methods which set up the electromagnetic field by means of electrodes buried in the earth is that a much more powerful field can be set up, the cable is quickly laid, thus eliminating digging holes in the earth for the electrodes, and carrying water with which to wet the electrodes. This last advantage is particularly worthy in dry climates. An advantage which this invention has over my co-pending application, Serial No. 438,354 filed March 24, 1930, is that it is much easier to lay the cable in a polygonal form than in a true circle, thus making the work faster. In open country where surveying is easy no great disadvantage lies in having to confine observations to the normal planes of symmetry. In densely wooded regions, however, it is not always possible to make observations on these definite lines and in this case my co-pending application No. 438,354 is to be preferred. When the number of sides of a regular polygon is indefinitely increased the polygon approaches a circle and this invention in that case approaches as a limit my co-pending application referred to above.

The foregoing description has been given as regards Fig. 4 but the other forms of the invention shown in Figs. 1, 2, 3 and 5 are to be practiced in the same manner. The forms showing a regular geometrical figure having straight sides are to be preferred as the normal position of the plane of the vibration ellipse may be more readily determined in these cases.

The geometrical figures illustrated in this application are of material advantage as regards economical practising of the invention in that by taking observations about a single set up of the cable 1 the distortion or deviation from normal of the plane of the vibration ellipse will be observed accurately at a plurality of observation points, each of which will serve as a means of determining the direction, extent and location of the nonhomogeneous formation. For instance, with a cable laid as shown in Figs. 3 or 4 it seems apparent that any body of non-homogeneous substance such as 7 will have a distorting effect upon the plane of the vibration ellipse which will be observed upon each of the lines 3. For most practical cases it is sufficient to consider the buried mineral deposit as lying beneath the general region of large deviations.

What I claim as new and desire to protect by Letters Patent is:

1. An apparatus for determining the existence and location of concealed objects whose electromagnetic constants differ from those of the surrounding space, including a linear conductor disposed in the form of a closed plane figure, said figure having a finite number of lines of symmetry, a source of alternating current for energizing said conductor, and means to determine the departure from symmetry of the resulting electromagnetic field.

2. An apparatus for determining the existence and location of buried mineral deposits including a cable disposed in the form of a closed plane figure, said figure possessing a finite number of lines of symmetry, a source of alternating electric current for energizing said cable, a rotatable loop apparatus for determining the plane of the vibration ellipse of the magnetic component of the resultant electromagnetic field, means to amplify the currents induced in said loop apparatus, and means of converting said amplified currents into a form of energy to which human sense perception responds.

3. An apparatus of the character described for determining the existence and location of concealed objects including, a source of electromagnetic waves, means to distribute said waves in a location normally symmetrical about a plurality of planes, and a detecting apparatus adapted to determine the symmetry of the resultant radiation from said source.

4. A device of the character described including in combination a closed linear conductor, said conductor being disposed in the form of a plane figure, said figure possessing a finite numbers of lines of symmetry, a source of alternating electric currents for energizing said conductor and a receiving apparatus including means for determining the position in space of the plane of the vibration ellipse of the magnetic component of the resulting electromagnetic field.

NORMAN H. RICKER.